US00RE45014E

(19) United States
(12) Reissued Patent
Ribas-Corbera et al.

(10) Patent Number: US RE45,014 E
(45) Date of Reissued Patent: Jul. 15, 2014

(54) METHODS FOR MOTION ESTIMATION WITH ADAPTIVE MOTION ACCURACY

(75) Inventors: Jordi Ribas-Corbera, Redmond, WA (US); Jiandong Shen, Sunnyvale, CA (US)

(73) Assignee: Sharp Kabushiki Kaisha, Osaka (JP)

(21) Appl. No.: 11/984,661

(22) Filed: Nov. 20, 2007

Related U.S. Patent Documents

Reissue of:
(64) Patent No.: 6,968,008
Issued: Nov. 22, 2005
Appl. No.: 09/615,791
Filed: Jul. 13, 2000

U.S. Applications:
(60) Provisional application No. 60/146,102, filed on Jul. 27, 1999.

(51) Int. Cl.
*H04N 7/18* (2006.01)

(52) U.S. Cl.
USPC ..... 375/240.16; 375/240.17

(58) Field of Classification Search
USPC ..... 375/240.16–240.29
See application file for complete search history.

(56) References Cited

U.S. PATENT DOCUMENTS

| | | | |
|---|---|---|---|
| 4,864,393 | A | 9/1989 | Harradine et al. |
| 4,937,666 | A | 6/1990 | Yang |
| 5,105,271 | A | 4/1992 | Niihara |
| 5,408,269 | A | 4/1995 | Tsukagoshi et al. |
| 5,489,949 | A | 2/1996 | Jeong et al. |
| 5,610,658 | A | 3/1997 | Uchida et al. |
| 5,623,313 | A | 4/1997 | Naveen |
| 5,682,205 | A | 10/1997 | Sezan et al. |
| 5,694,179 | A | 12/1997 | Kwak et al. |
| 5,754,240 | A | 5/1998 | Wilson et al. |
| 5,767,907 | A | 6/1998 | Pearlstein |
| 5,844,616 | A | 12/1998 | Collet et al. |

(Continued)

FOREIGN PATENT DOCUMENTS

| | | | |
|---|---|---|---|
| DE | 19730305 | A1 | 1/1999 |
| EP | 0420653 | A2 | 4/1991 |

(Continued)

OTHER PUBLICATIONS

Bernd Girod, Motion-Compensating Prediction with Fractional-Pel Accuracy, IEEE Transactions on Communications, vol. 41, No. 4, pp. 604-612, Apr. 1993.

(Continued)

*Primary Examiner* — Andy Rao
(74) *Attorney, Agent, or Firm* — Birch, Stewart, Kolasch & Birch, LLP

(57) ABSTRACT

Methods for motion estimation with adaptive motion accuracy of the present invention include several techniques for computing motion vectors of high pixel accuracy with a minor increase in computation. One technique uses fast-search strategies in sub-pixel space that smartly searches for the best motion vectors. An alternate technique estimates high-accurate motion vectors using different interpolation filters at different stages in order to reduce computational complexity. Yet another technique uses rate-distortion criteria that adapts according to the different motion accuracies to determine both the best motion vectors and the best motion accuracies. Still another technique uses a VLC table that is interpreted differently at different coding units, according to the associated motion vector accuracy.

2 Claims, 16 Drawing Sheets

(56) References Cited

U.S. PATENT DOCUMENTS

| | | | | |
|---|---|---|---|---|
| 5,987,181 | A | 11/1999 | Makiyama et al. | |
| 6,005,509 | A | 12/1999 | Buckreuss et al. | |
| 6,205,176 | B1 | 3/2001 | Sugiyama | |
| 6,249,318 | B1 | 6/2001 | Girod et al. | |
| 6,269,174 | B1 * | 7/2001 | Koba et al. | 382/107 |
| 6,714,593 | B1 | 3/2004 | Benzler et al. | |
| 6,968,008 | B1 | 11/2005 | Ribas-Corbera et al. | |
| 7,224,733 | B1 | 5/2007 | Benzler et al. | |
| 2001/0017889 | A1 | 8/2001 | Borer | |

FOREIGN PATENT DOCUMENTS

| | | | |
|---|---|---|---|
| EP | 1073276 | A2 | 1/2001 |
| GB | 2 305 569 | A | 4/1997 |
| JP | 4-264889 | | 9/1992 |
| JP | 7-95585 | | 4/1995 |
| JP | 8-116532 | | 5/1996 |
| JP | 9-153820 | | 6/1997 |
| JP | 1042295 | | 2/1998 |
| JP | 11-46364 | A | 2/1999 |
| JP | 11-55673 | A | 2/1999 |
| JP | 2001-189934 | A | 7/2001 |
| JP | 2011-35928 | A | 2/2011 |
| JP | 2012-75175 | A | 4/2012 |
| WO | WO 98/41011 | A1 | 9/1998 |
| WO | WO 99/04574 | | 1/1999 |
| WO | WO-99/04574 | | 1/1999 |

OTHER PUBLICATIONS

Smita Gupta and Allen Gersho, On Fractional Pixel Motion Estimation, Proc. SPIE VCIP, vol. 2094, pp. 408-419, Cambridge, Nov. 1993.

Xiaoming Li and Cesar Gonzales, A Locally Quadratic Model of the Motion Estimation Error Criterion Function and Its Application to Subpixel Interpolations, IEEE Transactions on Circuits and Systems for Video Technology, vol. 6, No. 1, Feb. 1996.

Jordi Ribas-Corbera and David L. Neuhoff, On the Optimal Motion Vector Accuracy for Block-Based Motion-Compensated Video Coders, Proc. IST/SPIE Digital Video Compression: Algorithms and Technologies, pp. 302-314, San Jose, Feb. 1996.

Ulrich Benzler, Proposal for a new core experiment on prediction enhancement at higher bitrates, ISO/IEC JTC1/SC29/WG11 Coding of Moving Pictures and Audio, MPEG 97/1827, Sevilla, Feb. 1997.

Ulrich Benzler, Performance Evaluation of a Reduced Complexity Implementation for Quarter Pel Motion Compensation, ISO/IEC JTC1/SC29/WG11 Coding of Moving Pictures and Audio, MPEG 97/3146, San Jose, Jan. 1998.

Response to Call for Proposals for H.26L, ITU-Telecommunications Standardization Section, Q.15/SG16, doc. Q15-F-11, Seoul, Nov. 1998.

Enhancement for the Telenor proposal for H.26L, ITU-Telecommunications Standardization Section, Q. 15/SG16, doc. Q15-G-25, Monterey, Feb. 1999.

Chan et al., "Review of Block Matching Based Motion Estimation Algorithms for Video Compression," Electrical and Computer Engineering, Canadian Conference on Vancouver, BC, Canada 14-17, Sep. 14, 1993, New York, NY, USA, IEEE, pp. 151-154, XP010117942.

Ebrahimi et al., "A video codec based on perceptually derived and localized wavelet transform for mobile applications," Signal Processing Theories and Applications, Brussels, Aug. 24-27, 1992, vol. 3, pp. 1361-1364, XP000356495.

Joshi et al., "Lossy Encoding of Motion Vectors Using Entropy-Constrained Vector Quantization," IEEE Comp. Soc. Press, US, Proceedings of the International Conference on Image Processing (ICIP), Washington, Oct. 23-26, 1995, vol. 3, Los Alamitos, pp. 109-112, XP010197142.

Lee, "Rate-Distortion Optimized Motion Smoothing for MPEG-2 Encoding," Proceedings of the International Conference on Image Processing (ICIP), Los Alamitos, CA, vol. 2, Jan. 1, 1997, pp. 45-48, XP00914163.

Netravali et al., "A Codec for HDTV," IEEE Transactions on Consumer Electronics, IEEE Service Center, New York, NY, US, vol. 38, No. 3, Aug. 1, 1992, pp. 325-340, XP000311862.

Ohm, "Motion-Compensated 3-D Subband Coding with Multiresolution Representation of Motion Parameters," IEEE, Proceedings of the International Conference on Image Processing (ICIP), Nov. 13-16, 1994, vol. 3, Conf. 1, pp. 250-254, XP010146425.

Wedi, "Results of core experiment on Adaptive Motion Accuracy (AMA) with ½, ¼ and ⅛-pel accuracy," ITU Study Group 16—Video Coding Experts Group, May 16, 2000, pp. 1-9, XP002301984.

Extended European Search Report, dated May 24, 2011, for European Application No. 10013511.0.

Pang et al., "Optimum Loop Filter in Hybrid Coders", IEEE Transactions on Circuits and Systems for Video Technology, vol. 4, No. 2, pp. 158-167, Apr. 1994, XP000489688.

Shen et al., "Adaptive motion accuracy (AMA) in Telenor's proposal", ITU—Telecommunications Standardization Sector, Study Group 16, Video Coding Experts Group (Question 15), Q15-H-20, Eighth Meeting, Berlin, Aug. 3-6, 1999, XP030002958.

Fujiwara, "Point illustrated Newest MPEG Textbook," ASCII Corporation, 1994, p. 114.

* cited by examiner

METHODS FOR MOTION ESTIMATION WITH ADAPTIVE MOTION ACCURACY

Matter enclosed in heavy brackets [ ] appears in the original patent but forms no part of this reissue specification; matter printed in italics indicates the additions made by reissue.

This application claims the benefit of Provisional Application No. 60/146,102, filed Jul., 27, 1999.

BACKGROUND OF THE INVENTION

The present invention relates generally to a method of compressing or coding digital video with bits and, specifically, to an effective method for estimating and encoding motion vectors in motion-compensated video coding.

In classical motion estimation the current frame to be encoded is decomposed into image blocks of the same size, typically blocks of 16×16 pixels, called "macroblocks." For each current macroblock, the encoder searches for the block in a previously encoded frame (the "reference frame") that best matches the current macroblock. The coordinate shift between a current macroblock and its best match in the reference frame is represented by a two-dimensional vector (the "motion vector") of the macroblock. Each component of the motion vector is measured in pixel units.

For example, if the best match for a current macroblock happens to be at the same location, as is the typical case in stationary background, the motion vector for the current macroblock is (0,0). If the best match is found two pixels to the right and three pixels up from the coordinates of the current macroblock, the motion vector is (2,3). Such motion vectors are said to have integer pixel (or "integer-pel" or "full-pel") accuracy, since their horizontal X and vertical Y components are integer pixel values. In FIG. 1, the vector $V_1$=(1,1) represents the full-pel motion vector for a given current macroblock.

Moving objects in a video scene do not move in integer pixel increments from frame to frame. True motion can take any real value along the X and Y directions. Consequently, a better match for a current macroblock can often be found by interpolating the previous frame by a factor N×N and then searching for the best match in the interpolated frame. The motion vectors can then take values in increments of 1/N pixel along X and Y and are said to have 1/N pixel (or "1/N-pel") accuracy.

In "Response to Call for Proposals for H.26L," ITU-Telecommunications Standardization Sector, Q.15/SG16, doc. Q15-F-11, Seoul, Nov. 98, and "Enhancement of the Telenor proposal for H.26L," ITU-Telecommunications Standardization Sector, Q.15/SG16, doc. Q15-G-25, Monterey, Feb. 99, Gisle Bjontegaard proposed using ⅓-pel accurate motion vectors and cubic-like interpolation for the H26L video coding standard (the "Telenor encoder"). To do this, the Telenor encoder interpolates or "up-samples" the reference frame by 3×3 using a cubic-like interpolation filter. This interpolated version requires nine times more memory than the reference frame. At a given macroblock, the Telenor encoder estimates the best motion vector in two steps: the encoder first searches for the best integer-pel vector and then the Telenor encoder searches for the best ⅓-pixel accurate vector $V_{1/3}$ near $V_1$. Using FIG. 1 as an example, a total of eight blocks (of 16×16 pixels) in the 3×3 interpolated reference frame are checked to find the best match which, as shown is the block associated to the motion vector $V_{1/3}$=(VX, VY)=(1+⅓,1). The Telenor encoder has several problems. First, it uses a sub-optimal fast-search strategy and a complex cubic filter (at all stages) to compute the ⅓-pel accurate motion vectors. As a result, the computed motion vectors are not optimal and the memory and computation requirements are very expensive. Further, the Telenor encoder uses an accuracy of the effective rate-distortion criteria that is fixed at ⅓-pixel and, therefore, does not adapt to select better motion accuracies. Similarly, the Telenor encoder variable-length code ("VLC") table has an accuracy fixed at ⅓-pixel and, therefore, is not adapted and interpreted differently for different accuracies.

Most known video compression methods estimate and encode motion vectors with ½-pixel accuracy, because early studies suggested that higher or adaptive motion accuracies would increase computational complexity without providing additional compression gains. These early studies, however, did not estimate the motion vectors using optimized rate-distortion criteria, did not exploit the convexity properties of such criteria to reduce computational complexity, and did not use effective strategies to encode the motion vectors and their accuracies.

One such early study was Bernd Girod's "Motion-Compensating Prediction with Fractional-Pel Accuracy," IEEE Transactions on Communications, Vol. 41, No. 4, pp. 604-612, April 1993 (the "Girod work"). The Girod work is the first fundamental analysis on the benefits of using sub-pixel motion accuracy for video coding. Girod used a simple, hierarchical strategy to search for the best motion vector in sub-pixel space. He also used simple mean absolute difference ("MAD") criteria to select the best motion vector for a given accuracy. The best accuracy was selected using a formula that is not useful in practice since it is based on idealized assumptions, is very complex, and restricts all motion vectors to have the same accuracy within a frame. Finally, Girod focused only on prediction error energy and did not address how to use bits to encode the motion vectors.

Another early study was Smita Gupta's and Allen Gersho's "On Fractional Pixel Motion Estimation," Proc. SPIE VCIP, Vol. 2094, pp. 408-419, Cambridge, November 1993 (the "Gupta work"). The Gupta work presented a method for computing, selecting, and encoding motion vectors with sub-pixel accuracy for video compression. The Gupta work disclosed a formula based on mean squared error ("MSE") and bilinear interpolation, used this formula to find an ideal motion vector, and then quantized such vector to the desired motion accuracy. The best motion vector for a given accuracy was found using the sub-optimal MSE criteria and the best accuracy was selected using the largest decrease in difference energy per distortion bit, which is a greedy (sub-optimal) criteria. A given motion vector was coded by first encoding that vector with ½-pel accuracy and then encoding the higher accuracy with refinement bits. Coarse-to-fine coding tends to require significant bit overhead.

In "On the Optimal Motion Vector Accuracy for Block-Based Motion-Compensated Video Coders," Proc. IST/SPIE Digital Video Compression: Algorithms and Technologies, pp. 302-314, San Jose, February 1996 (the "Ribas work"), Jordi Ribas-Corbera and David L. Neuhoff, modeled the effect of motion accuracy on bit rate and proposed several methods to estimate the optimal accuracies that minimize bit rate. The Ribas work set forth a full-search approach for computing motion vectors for a given accuracy and considered only bilinear interpolation. The best motion vector was found by minimizing MSE and the best accuracy was selected using some formulas derived from a rate-distortion optimization. The motion vectors and accuracies were encoded with frame-adaptive entropy coders, which are complex to implement in real-time applications.

In "Proposal for a new core experiment on prediction enhancement at higher bitrates," ISO/IEC JTC1/SC29/WG11 Coding of Moving Pictures and Audio, MPEG 97/1827, Sevilla, February 1997 and "Performance Evaluation of a Reduced Complexity Implementation for Quarter Pel Motion Compensation," ISO/IEC JTC1/SC29/WG11 Coding of Moving Pictures and Audio, MPEG 97/3146, San Jose, January 1998, Ulrich Benzler proposed using ¼-pel accurate motion vectors for the video sequence and more advanced interpolation filters for the MPEG4 video coding standard. Benzler, however, used the Girod's fast-search technique to find the ¼-pel motion vectors. Benzler did consider different interpolation filters, but proposed a complex filter at the first stage and a simpler filter at the second stage and interpolated one macroblock at a time. This approach does not require much cache memory, but it is computationally expensive because of its complexity and because all motion vectors are computed with ¼-pel accuracy for all the possible modes in a macroblock (e.g., 16×16, four-8×8, sixteen-4×4, etc.) and then the best mode is determined. Benzler used the MAD criteria to find the best motion vector which was fixed to ¼-pel accuracy for the whole sequence, and hence he did not address how to select the best motion accuracy. Finally, Benzler encoded the motion vectors with a variable-length code ("VLC") table that could be used for encoding ½-and ¼-pixel accurate vectors.

The references discussed above do not estimate the motion vectors using optimized rate-distortion criteria and do not exploit the convexity properties of such criteria to reduce computational complexity. Further, these references do not use effective strategies to encode motion vectors and their accuracies.

BRIEF SUMMARY OF THE INVENTION

One preferred embodiment of the present invention addresses the problems of the prior art by computing motion vectors of high pixel accuracy (also denoted as "fractional" or "sub-pixel" accuracy) with a minor increase in computation.

Experiments have demonstrated that, by using the search strategy of the present invention, a video encoder can achieve significant compression gains (e.g., up to thirty percent in bit rate savings over the classical choices of motion accuracy) using similar levels of computation. Since the motion accuracies are adaptively computed and selected, the present invention may be described as adaptive motion accuracy ("AMA").

One preferred embodiment of the present invention uses fast-search strategies in sub-pixel space that smartly searches for the best motion vectors. This technique estimates motion vectors in motion-compensated video coding by finding a best motion vector for a macroblock. The first step is searching a first set of motion vector candidates in a grid of sub-pixel resolution of a predetermined square radius centered on $V_1$ to find a best motion vector $V_2$. Next, a second set of motion vector candidates in a grid of sub-pixel resolution of a predetermined square radius centered on $V_2$ is searched to find a best motion vector $V_3$. Then, a third set of motion vector candidates in a grid of sub-pixel resolution of a predetermined square radius centered on $V_3$ is searched to find the best motion vector of the macroblock.

In an alternate preferred embodiment the present invention, a technique for estimating high-accurate motion vectors may use different interpolation filters at different stages in order to reduce computational complexity.

Another alternate preferred embodiment of the present invention selects the best vectors and accuracies in a rate-distortion ("RD") sense. This embodiment uses rate-distortion criteria that adapts according to the different motion accuracies to determine both the best motion vectors and the best motion accuracies.

Still further, another alternate preferred embodiment of the present invention encodes the motion vector and accuracies with an effective VLC approach. This technique uses a VLC table that is interpreted differently at different coding units, according to the associated motion vector accuracy.

The foregoing and other objectives, features, and advantages of the invention will be more readily understood upon consideration of the following detailed description of the invention, taken in conjunction with the accompanying drawings.

DETAILED DESCRIPTION OF THE INVENTION

The methods of the present invention are described herein in terms of the motion accuracy being modified at each image block. These methods, however, may be applied when the accuracy is fixed for the whole sequence or modified on a frame-by-frame basis. The present invention is also described as using Telenor's video encoders (and particularly the Telenor encoder) as described in the Background of the Invention. Although described in terms of Telenor's video encoders, the techniques described herein are applicable to any other motion-compensated video coder.

Figure 1:
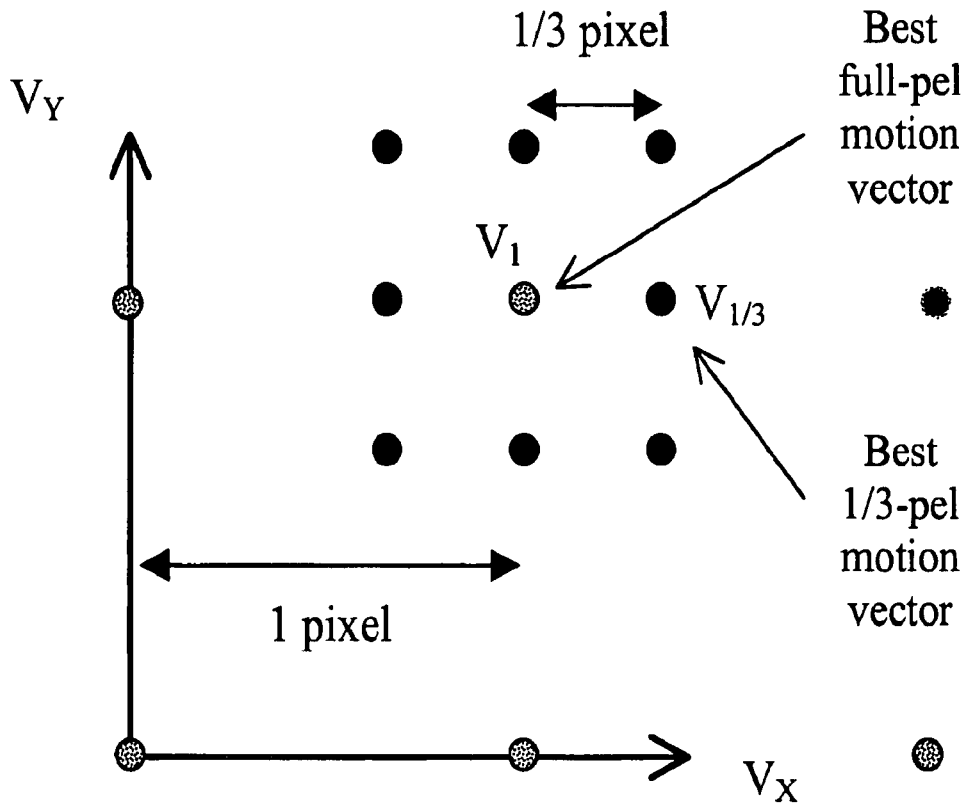
FIG. 1 is a diagram of exemplary full-pel and ⅓-pel locations in velocity space.
Figure 2:
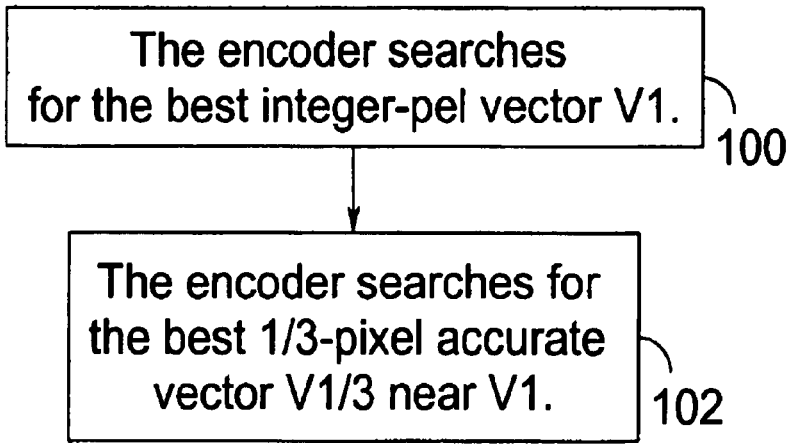
FIG. 2 is a flowchart illustrating a prior art method for estimating the best motion vector.

Most video coders use motion vectors with half pixel (or "½-pel") accuracy and bilinear interpolation. The first version of Telenor's encoder also used ½-pel motion vectors and bilinear interpolation. The latest version of Telenor's encoder, however, incorporated ⅓-pel vectors and cubic-like interpolation because of the additional compression gains. Specifically, at a given macroblock, Telenor's encoder estimates the best motion vector in two steps shown in FIG. 2. First, the Telenor encoder searches for the best integer-pel vector $V_1$ (FIG. 1) 100. Second, the Telenor encoder searches for the best ⅓-pixel accurate vector $V_{1/3}$ (FIG. 1) near $V_1$ 102. This second step is shown graphically in FIG. 1 where a total of eight blocks (each having an array of 16×16 pixels) in the 3×3 interpolated reference frame are checked to find the best match. The motion vectors for these eight blocks are represented by the eight solid dots in the grid centered on $V_1$. In FIG. 1 the best match is the block associated to the motion vector $V_{1/3}=(V_x, V_y)=(1+⅓, 1)$.

The technology of the present invention allows the encoder to choose between any set of motion accuracies (for example, ½, ⅓, and ⅙-pel accurate motion vectors) using either a full search strategy or a fast search strategy.

Full-Search AMA Search Strategy

Figure 4:
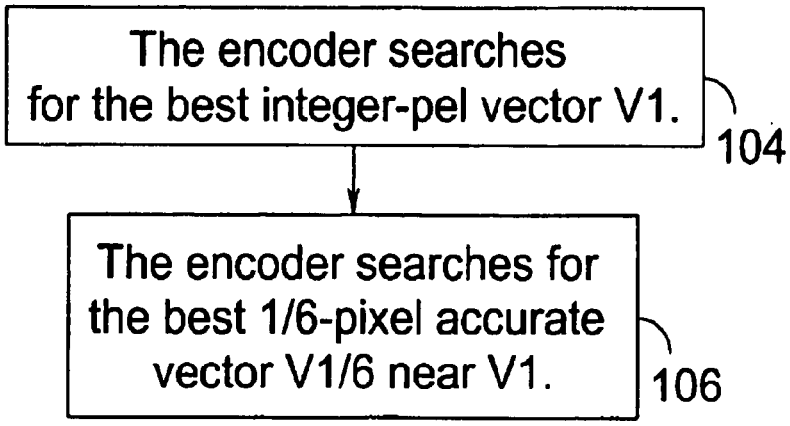
FIG. 4 is a flowchart illustrating a full-search preferred embodiment of the method for estimating the best motion vector of the present invention.
Figure 3:
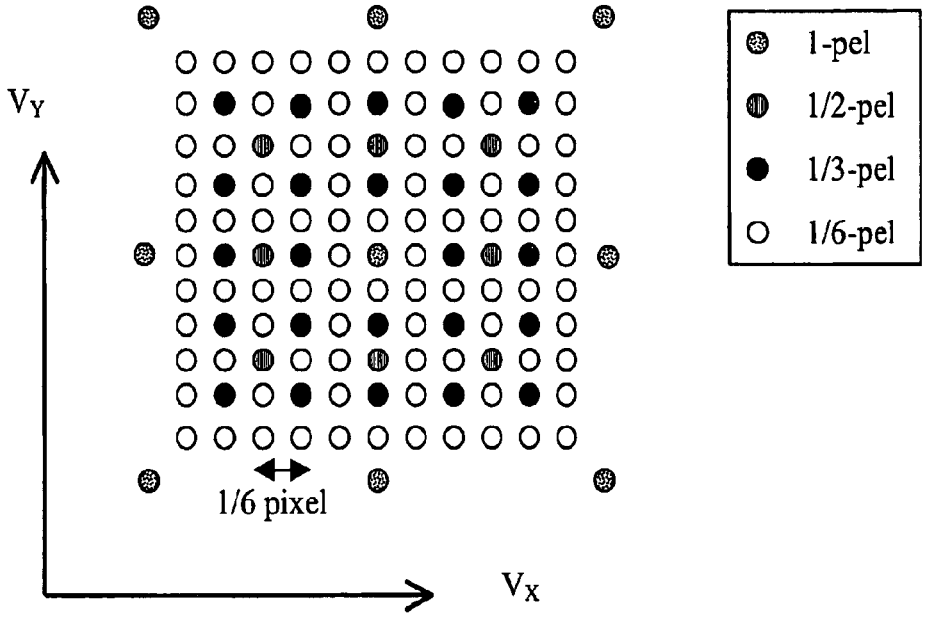
FIG. 3 is a diagram of an exemplary location of motion vector candidates for full-search in sub-pixel velocity space.

As shown in FIGS. 3 and 4, in the full-search adaptive motion accuracy ("AMA") search strategy the encoder searches all the motion vector candidates in a grid of ⅙-pixel resolution and a "square radius" (defined herein as a square block defined by a number of pixels up, a number of pixels down, and a number of pixels to both sides) of five pixels as shown in FIG. 3. FIG. 4 shows that the first step of the full-search AMA is to search for the best integer-pel vector $V_1$ (FIG. 1) 104. In the second step of the full-search AMA, the encoder searches for the best ⅙-pixel accurate vector $V_{1/6}$ (FIG. 3) near $V_1$ 106. In other words, the full-search AMA modifies the second step of the Telenor's process so that the encoder also searches for motion vector candidates in other sub-pixel locations in the velocity space. The objective is to find the best motion vector in the grid, i.e., the vector that points to the block (in the interpolated reference frame) that best matches the current macroblock. Although the full-search strategy is computationally complex since it searches 120 sub-pixel candidates, it shows the full potential of this preferred method of the present invention.

A critical issue in the motion vector search is the choice of a measure or criterion for establishing which block is the best match for the given macroblock. In practice, most methods use either the mean squared error ("MSE") or mean absolute difference ("MAD") criteria. The MSE between two blocks consists of subtracting the pixel values of the two blocks, squaring the pixel differences, and then taking the average. The MAD difference between two blocks is a similar distortion measure, except that the absolute value of the pixel differences is computed instead of the squares. If two image blocks are similar to each other, the MSE and MAD values will be small. If, however, the image blocks are dissimilar, these values will be large. Hence, typical video coders find the best match for a macroblock by selecting the motion vector that produces either the smallest MSE or the smallest MAD. In other words, the block associated to the best motion vector is the one closest to the given macroblock in an MSE or MAD sense.

Unfortunately, the MSE and MAD distortion measures do not take into account the cost in bits of actually encoding the vector. For example, a given motion vector may minimize the MSE, but it may be very costly to encode with bits, so it may not be the best choice from a coding standpoint.

To deal with this, advanced encoders such as those described by Telenor use rate-distortion ("RD") criteria of the type "distortion+L*Bits" to select the best motion vector. The value of "distortion" is typically the MSE or MAD, "L" is a constant that depends on the compression level (i.e., the quantization step size), and "Bits" is the number of bits required to code the motion vector. In general, any RD criteria of this type would work with the present invention. However, in the present invention "Bits" include the bits needed for encoding the vector and those for encoding the accuracy of the vector. In fact, some candidates can have several "Bits" values, because they can have several accuracy modes. For example, the candidate at location (½, −½) can be thought of having ½ or ⅙-pixel accuracy.

Fast-Search AMA Search Strategy

Figure 5:
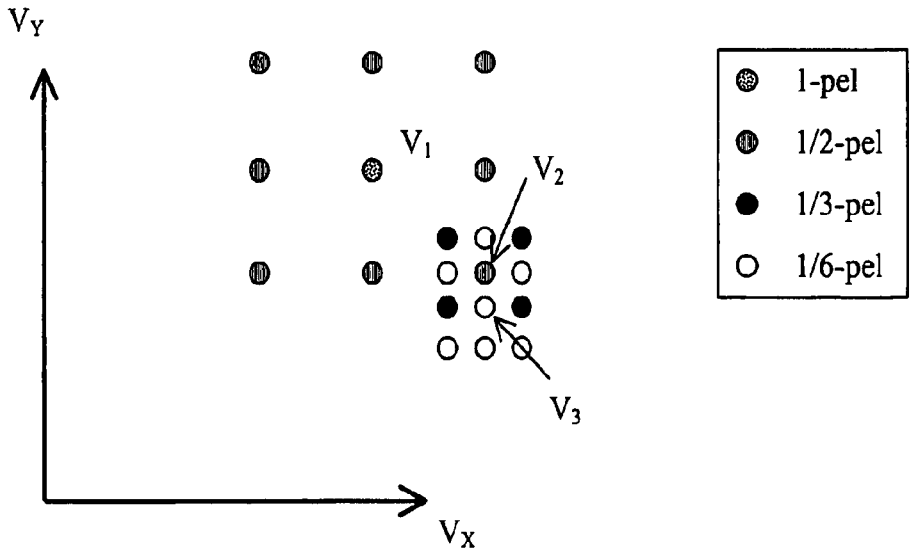
FIG. 5 is a diagram of an exemplary location of motion vector candidates for fast-search in sub-pixel velocity space.
Figure 6:
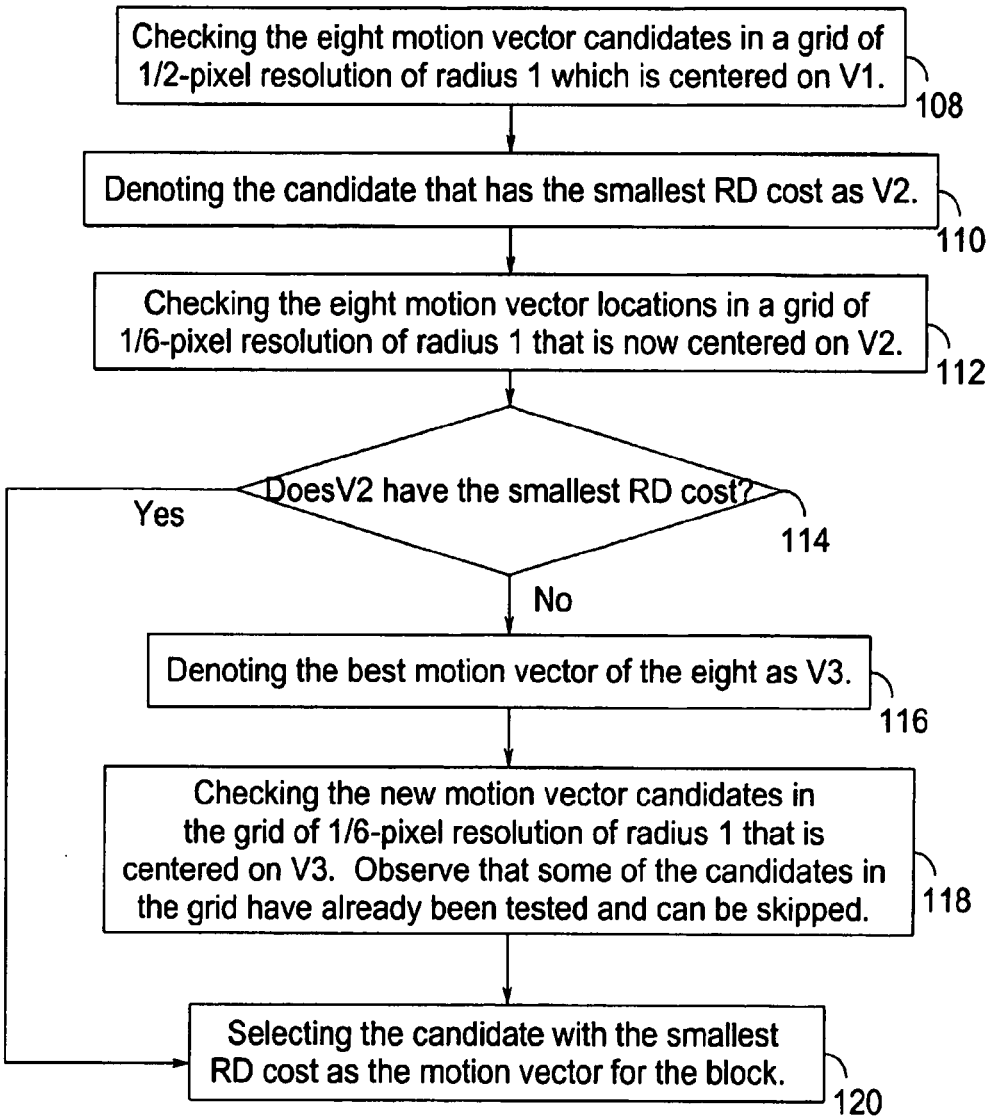
FIG. 6 is a flowchart illustrating a fast-search preferred embodiment of the method for estimating the best motion vector of the present invention.

As shown in FIGS. 5 and 6, in the fast-search adaptive motion accuracy ("AMA") search strategy the encoder checks only a small set of the motion vector candidates. In the first step of the fast-search AMA, the encoder checks the eight motion vector candidates in a grid of ½-pixel resolution of square radius 1, which is centered on $V_1$ 108. $V_2$ is then set to denote the candidate that has the smallest RD cost (i.e., the best of the eight previous vectors and $V_1$) 110. Next, the encoder checks the eight motion vector locations in a grid of ⅙-pixel resolution of square radius 1 that is now centered on $V_2$ 112. If $V_2$ has the smallest RD cost 114, the encoder stops its search and selects $V_2$ as the motion vector for the block. Otherwise, $V_3$ is set to denote the best motion vector of the eight 116. The encoder then searches for a new motion vector candidate in the grid of ⅙-pixel resolution of square radius 1 that is centered on $V_3$ 118. It should be noted that some of the candidates in this grid have already been tested and can be skipped. The candidate with the smallest RD cost in this last step is selected as the motion vector for the block 120.

Experimental data has shown that, on average, this simple fast search strategy typically checks the RD cost of about eighteen locations in sub-pixel space (ten more than Telenor's search strategy), and hence the overall computational complexity is only moderately increased.

The experimental data discussed below in connection with FIGS. 8-18 show that there is practically no loss in compression performance from using this fast-search version of AMA. This is because the fast-search AMA search strategy exploits the convexity of the "distortion+L*Bits" curve (c.f., "distortion" is known to be convex), by creating a path that smartly follows the RD cost from higher to lower levels.

Alternate embodiments of the invention replace one or more of the steps 108-120. These embodiments have also been effective and have further reduced the number of motion vector candidates to check in the sub-pixel velocity space.

Figure 7:
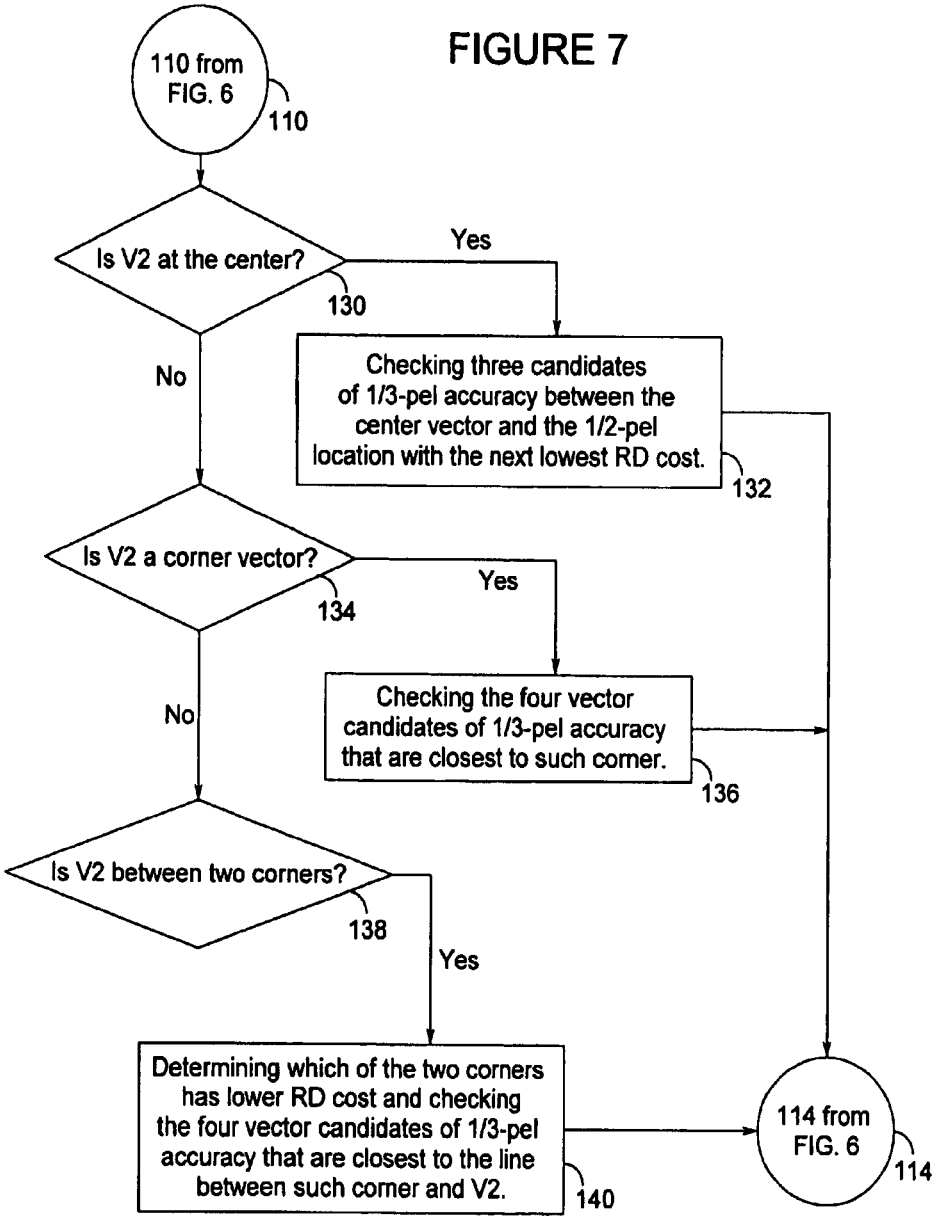
FIG. 7 is a detail flowchart illustrating an alternate preferred embodiment of step 114 of FIG. 6.

FIG. 7, for example, checks candidates of ⅓-pel accuracy. In this embodiment step 112 is replaced by one of three possible scenarios. First, if the best motion vector candidate from step 110 is at the center of $V_1$ (the "integer-pel vector") 130, then the encoder checks three candidates of ⅓-pel accuracy between the center vector and the ½-pel location with the next lowest RD cost 132. Second, if the best motion vector candidate from step 110 is a corner vector 134, then, the encoder checks the four vector candidates of ⅓-pel accuracy that are closest to such corner 136. Third, if the best motion vector candidate from step 110 is between two corners 138, then, the encoder determines which of these two corners has lower RD cost and checks the four vector candidates of ⅓-pel accuracy that are closest to the line between such corner and the best candidate from step 110 140. It should be noted that in implementing this process step 138 may be unnecessary because if $V_2$ is neither at the center or a corner vector, then it would necessarily be between two corners. If the encoder is set to find motion vectors with ⅓-pixel accuracy, FIG. 7 could be modified to end rather than continuing with step 114.

Computation And Memory Savings

Because step 108 checks only motion vector candidates of ½-pixel accuracy, the computation and memory requirements for the hardware or software implementation are significantly reduced. To be specific, in a smart implementation embodiment of this fast-search the reference frame is interpolated by 2×2 in order to obtain the RD costs for the ½-pel vector candidates. A significant amount of fast (or cache) memory for a hardware or software encoder is saved as compared to Telenor's approach that needed to interpolate the reference frame by 3×3. In comparison to the Telenor encoder, this is a cache memory savings of 9/4, or a factor of 2.25. The few additional interpolations can be done later on a block-by-block basis.

Additionally, since the interpolations in step 108 are used to direct the search towards the lower values of the RD cost function, a complex filter is not needed for these interpolations. Accordingly, computation power may be saved by using a simple bilinear filter for step 108.

Also, other key coding decisions such as selecting the mode of a macroblock (e.g., 16×16, four-8×8, etc.) can be done using the ½-pel vectors because such decisions do not benefit significantly from using higher accuracies. Then, the encoder can use a more complex cubic filter to interpolate the required sub-pixel values for the few additional vector candidates to check in the remaining steps. Since the macroblock mode has already been chosen, these final interpolations only need to be done for the chosen mode.

Use of multiple-filters obtained computation savings of over twenty percent in running time on a Sparc Ultra 10 Workstation in comparison to Telenor's approach, which uses a cubic interpolation all the time. Additionally, the fast-memory requirements were reduced by nearly half. Also, there was little or no loss in compression performance. Comparing one preferred embodiment of the fast-search, Benzler's technique requires about 70 interpolations per pixel in the Telenor encoder and the present invention requires only about 7 interpolations per pixel.

Coding The Motion Vector And Accuracies With Bits

Once the best motion vector and accuracy are determined, the encoder encodes both the motion vector and accuracy values with bits. One approach is to encode the motion vector with a given accuracy (e.g., half-pixel accuracy) and then add some extra bits for refining the vector to the higher motion accuracy. This is the strategy suggested by B. Girod, but it is sub-optimal in a rate-distortion sense.

In one preferred embodiment of the present invention, the accuracy of the motion vector for a macroblock is first encoded using a simple code such as the one given in Table 1. Any other table with code lengths {1, 2, 2} could be used as well. The bit rate could be further reduced using a typical DPCM approach.

TABLE 1

VLC table to indicate the accuracy mode for a given macroblock.

| Code | Motion Accuracy |
|---|---|
| 1 | ½-pel |
| 01 | ⅓-pel |
| 11 | ⅙-pel |

Next, the value of the vector/s in the respective accuracy space is encoded. These bits can be obtained from entries of a single VLC table such as the one used in the H26L codec. The key idea is that these bits are interpreted differently depending on the motion accuracy for the macroblock. For example, if the motion accuracy is ⅓ and the code bits for the X component of the difference motion vector are 00001[1], the X component of the vector is Vx=⅔. If the accuracy is ½, such code corresponds to Vx=1.

[1]Observe that this code is the fourth entry (code number 3) of H26L's VLC table in [6].

Compared to the Benzler method for encoding the motion vectors with a variable length code ("VLC") table that could be used for encoding ½and ¼pixel accurate vectors, the method of the present invention can be used for encoding vectors of any motion accuracy and the table can be interpreted differently at each frame and macroblock. Further, the general method of the present invention can be used for any motion accuracy, not necessarily those that are multiples of each other or those that are of the type 1/n (with n an integer). The number of increments in the given sub-pixel space is simply counted and the bits in the associated entry of the table is used as the code.

From the decoder's viewpoint, once the motion accuracy is decoded, the motion vector can also be easily decoded. After that, the associated block in the previous frame is reconstructed using a typical 4-tap cubic interpolator. There is a different 4-tap filter for each motion accuracy.

The AMA does not increase decoding complexity, because the number of operations needed to reconstruct the predicted block are the same, regardless of the motion accuracy.

Experimental Results

Figure 8:
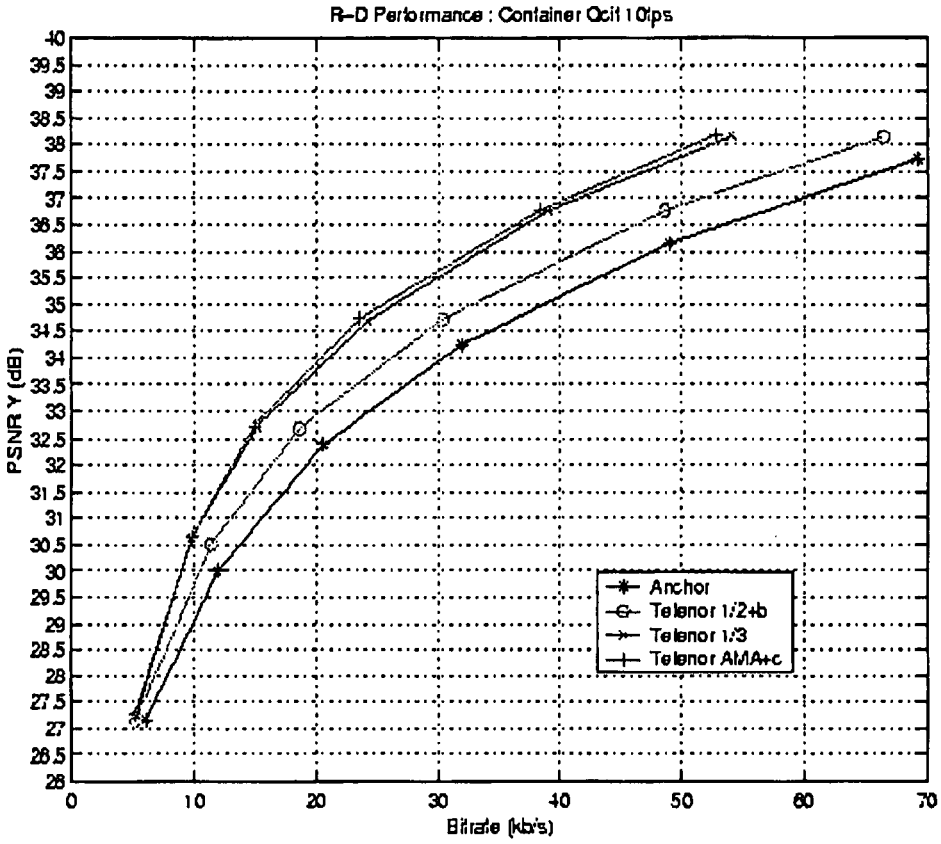
FIG. 8 is a graphical representation of experimental performance results of the Telenor encoder with and without AMA in the "Container" video sequence, with QCIF resolution, and at the frame rate of 10 frames per second.
Figure 9:
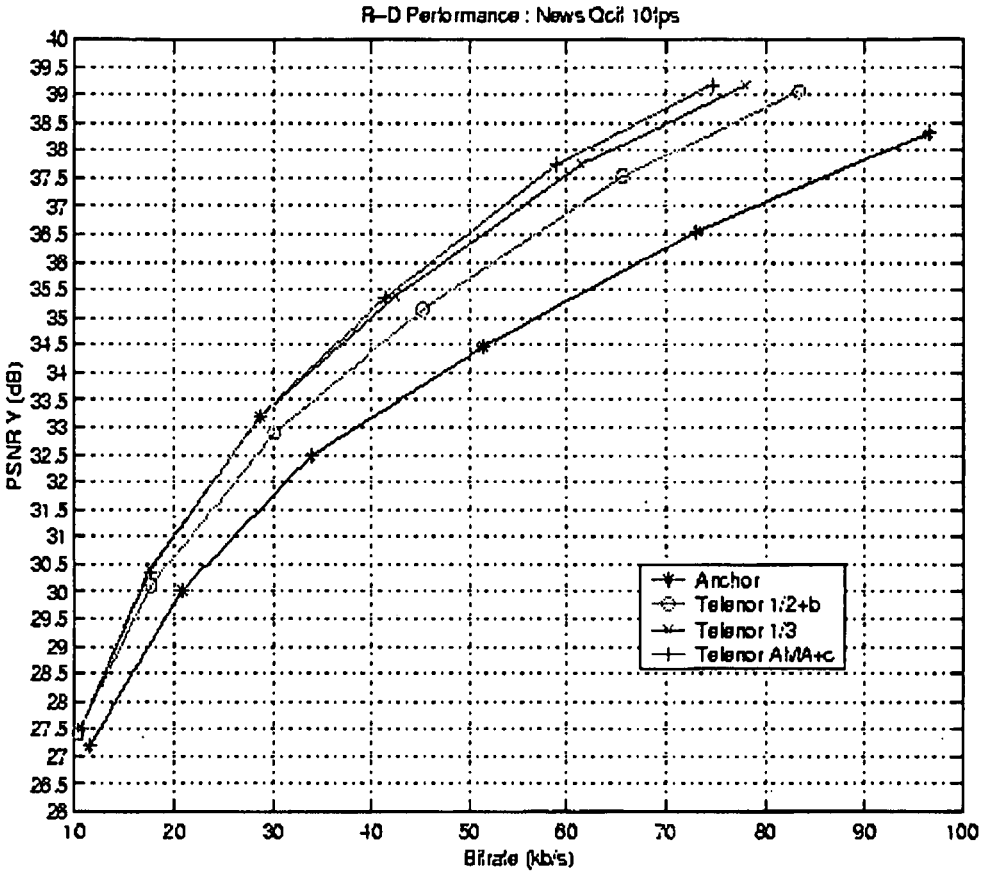
FIG. 9 is a graphical representation of experimental performance results of the Telenor encoder with and without AMA in the "News" video sequence, with QCIF resolution, and at the frame rate of 10 frames per second.
Figure 13:
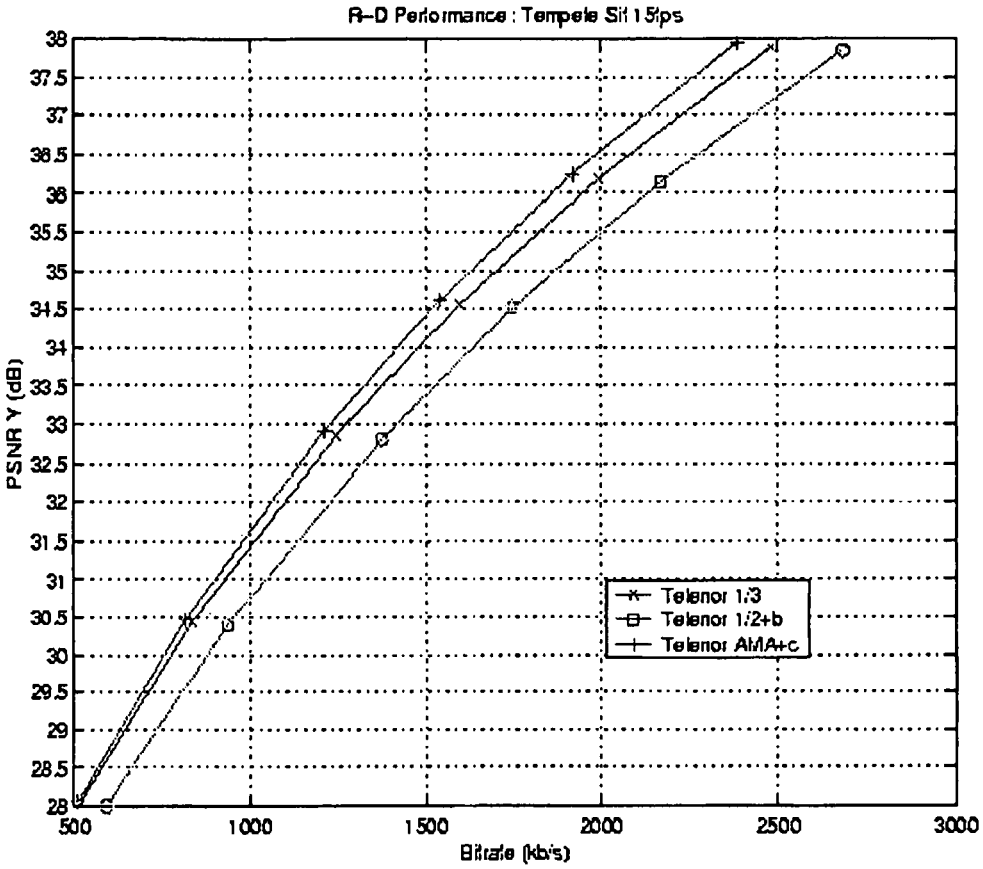
FIG. 13 is a graphical representation of experimental performance results of the Telenor encoder with and without AMA in the "Tempete" video sequence, with SIF resolution, and at the frame rate of 15 frames per second.
Figure 14:
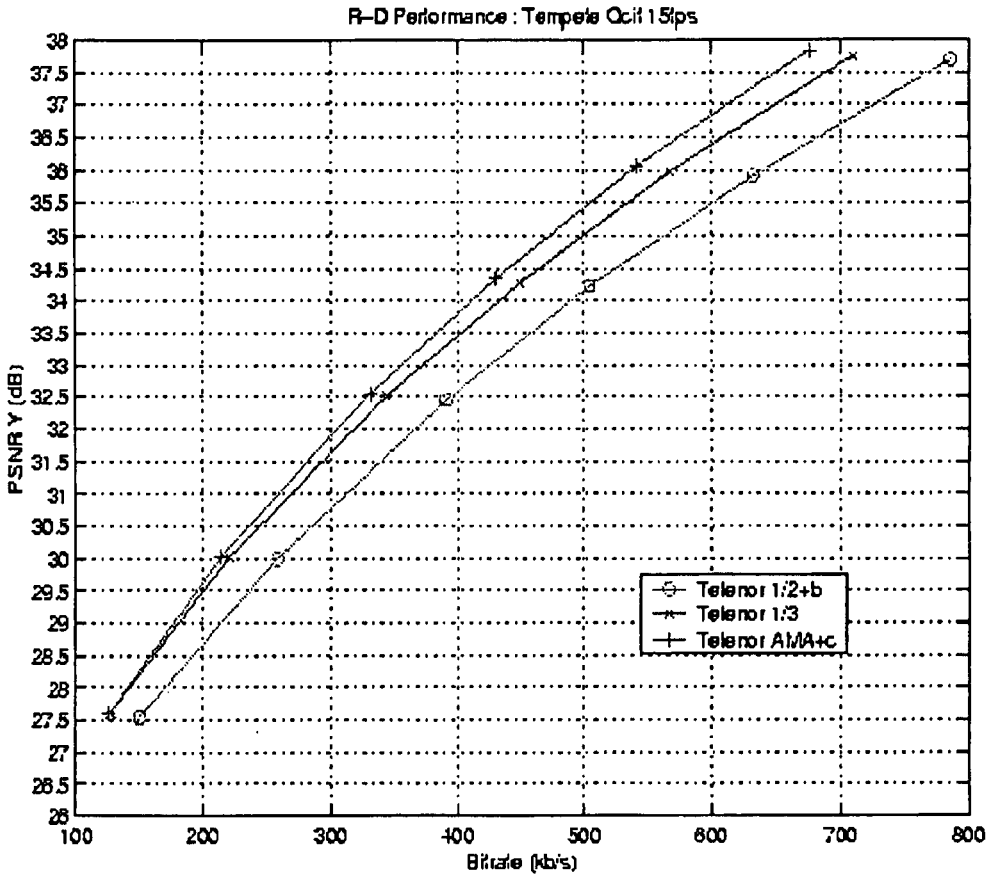
FIG. 14 is a graphical representation of experimental performance results of the Telenor encoder with and without AMA in the "Tempete" video sequence, with QCIF resolution, and at the frame rate of 15 frames per second.
Figure 15:
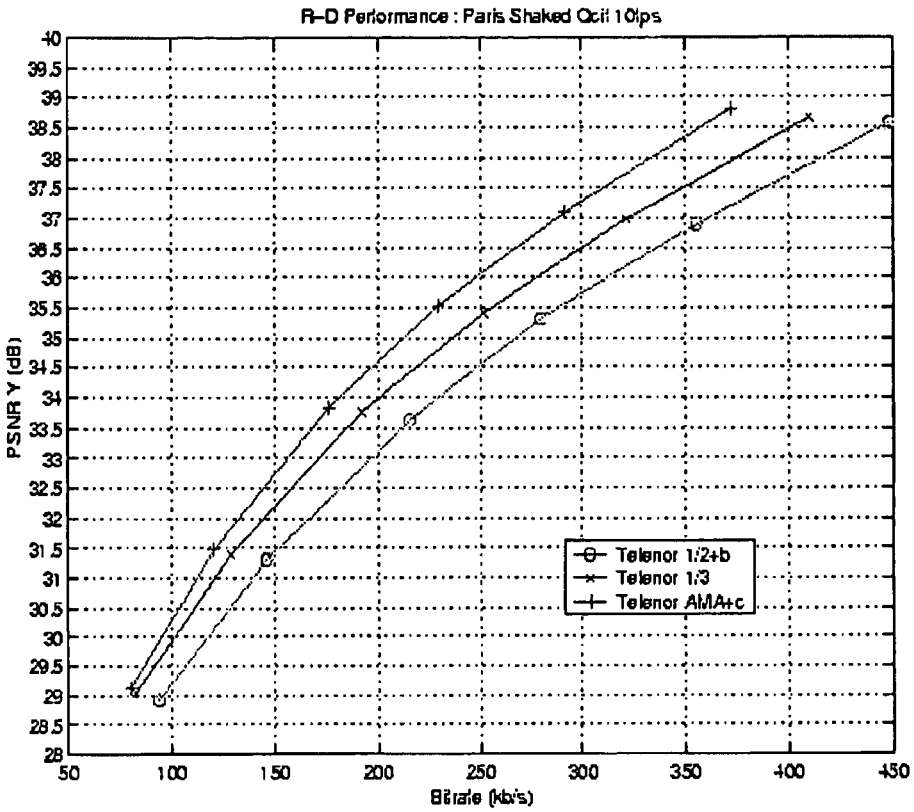
FIG. 15 is a graphical representation of experimental performance results of the Telenor encoder with and without AMA in the "Paris shaked" video sequence, with QCIF resolution, and at the frame rate of 10 frames per second.
Figure 16:
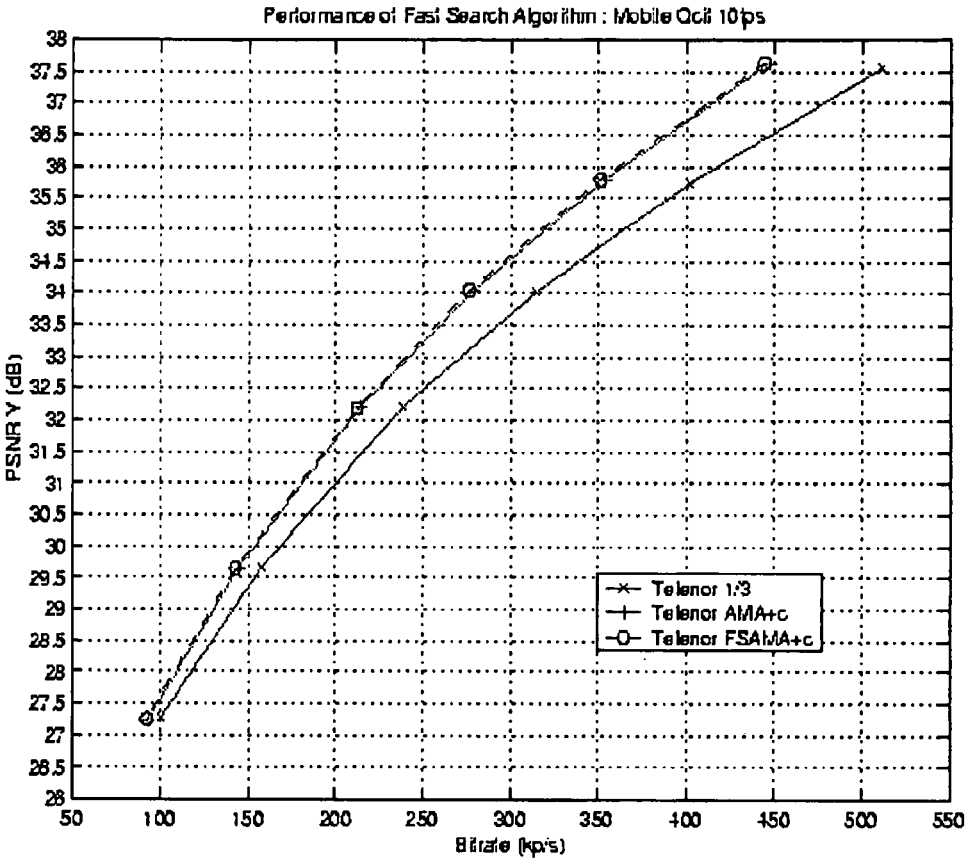
FIG. 16 is a graphical representation of experimental performance results of fast-search ("Telenor FSAMA+c") and full-search ("Telenor AMA+c") strategies in the "Mobile" video sequence, with QCIF resolution, and at the frame rate of 10 frames per second.
Figure 17:
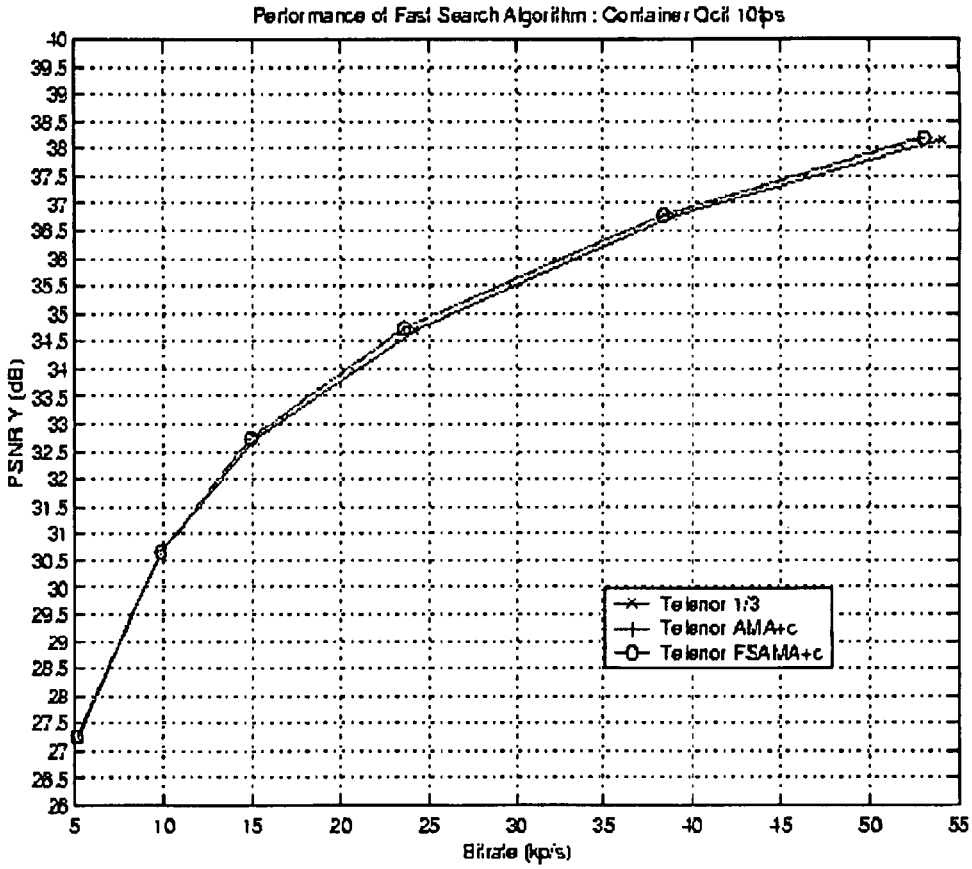
FIG. 17 is a graphical representation of experimental performance results of fast-search ("Telenor FSAMA+c") and full-search ("Telenor AMA+c") strategies in the "Container" video sequence, with QCIF resolution, and at the frame rate of 10 frames per second.

FIGS. 8-18 show test results of the Telenor encoder codec with and without AMA in a variety of video sequences, resolutions, and frame rates, as described in Table 2. These figures show rate-distortion ("RD") plots for each case. The "Anchor" curve shows RD points from optimized H.263+ (FIGS. 8 and 9 only). The "Telenor ½+b" curve shows Telenor with ½-pel vectors and bilinear interpolation (the "classical case"). The "Telenor ⅓" curve shows the current Telenor proposal (the "Telenor encoder"). The "Telenor+AMA+c" curve shows the Telenor encoder with the full-search strategy of the present invention. The "Telenor+FSAMA+c", as shown in FIGS. 15-17, shows the current Telenor encoder with the fast-search strategy. (Unless otherwise specified, the full-search version of AMA was the encoder strategy used in the experiments.) All of the test results were cross-checked at the encoder and decoder. These results show that with AMA the gains in peak signal-to-noise ratio ("PSNR") can be as high as 1 dB over H26L, and even higher over the classical case.

TABLE 2

Description of the Experiments

Figure 10:
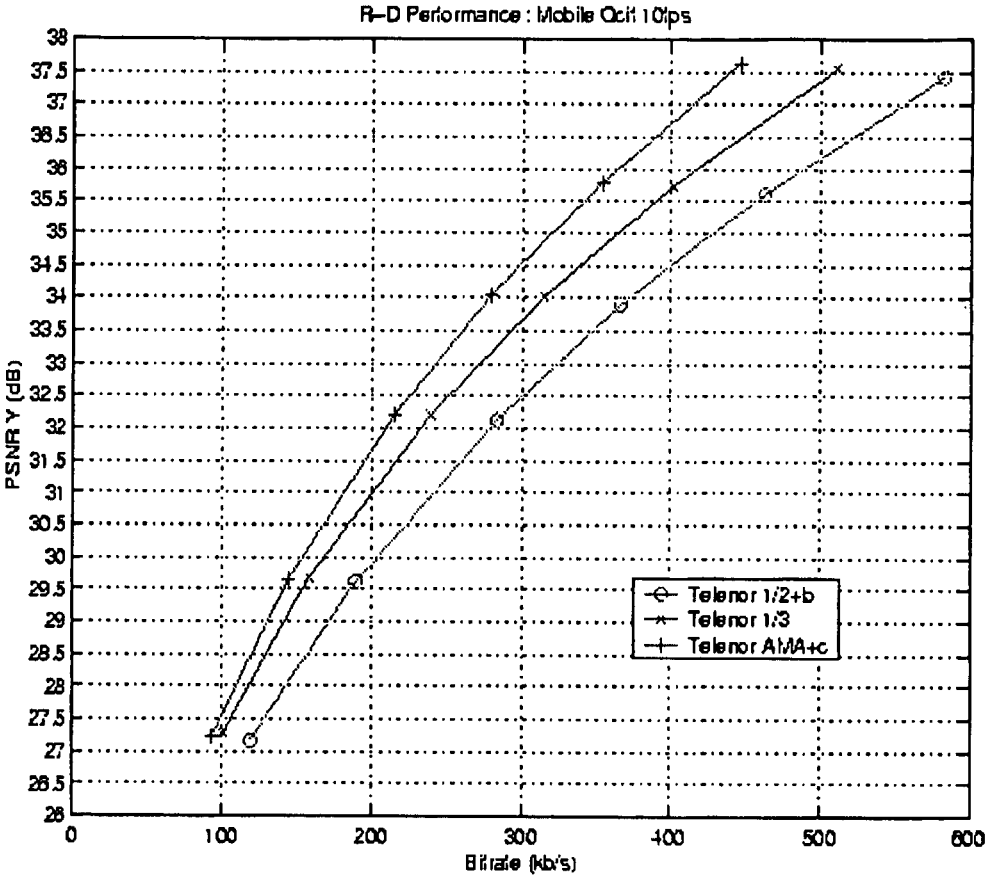
FIG. 10 is a graphical representation of experimental performance results of the Telenor encoder with and without AMA in the "Mobile" video sequence, with QCIF resolution, and at the frame rate of 10 frames per second.
Figure 11:
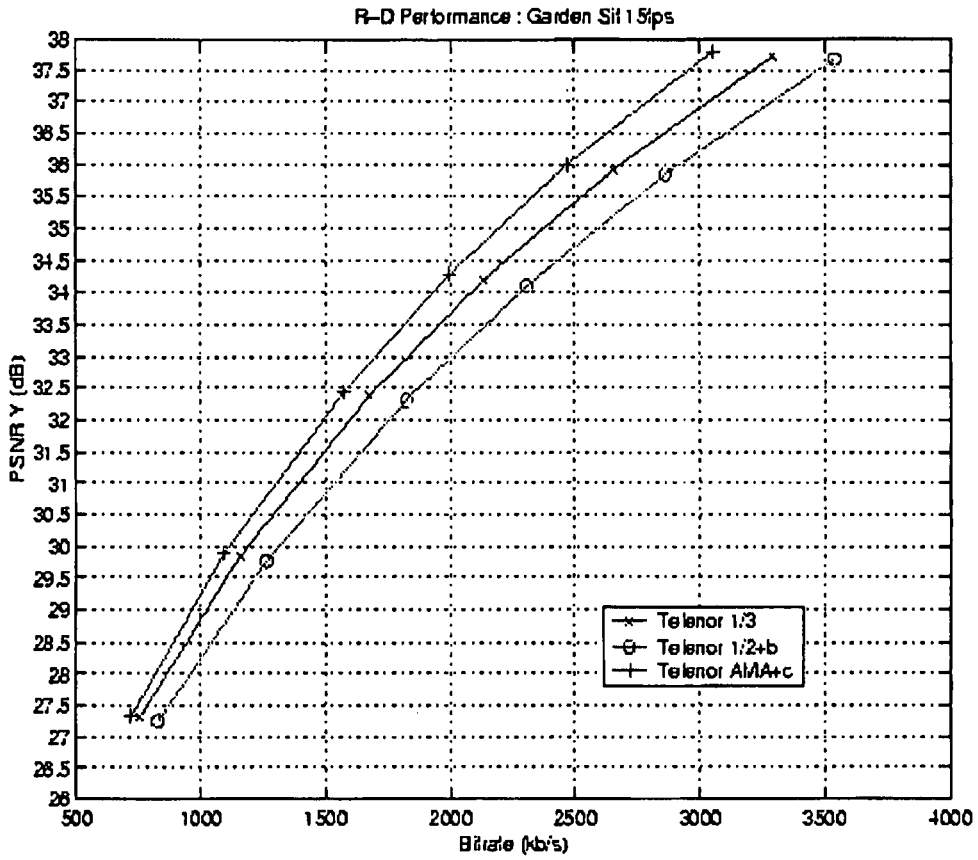
FIG. 11 is a graphical representation of experimental performance results of the Telenor encoder with and without AMA in the "Garden" video sequence, with SIF resolution, and at the frame rate of 15 frames per second.
Figure 12:
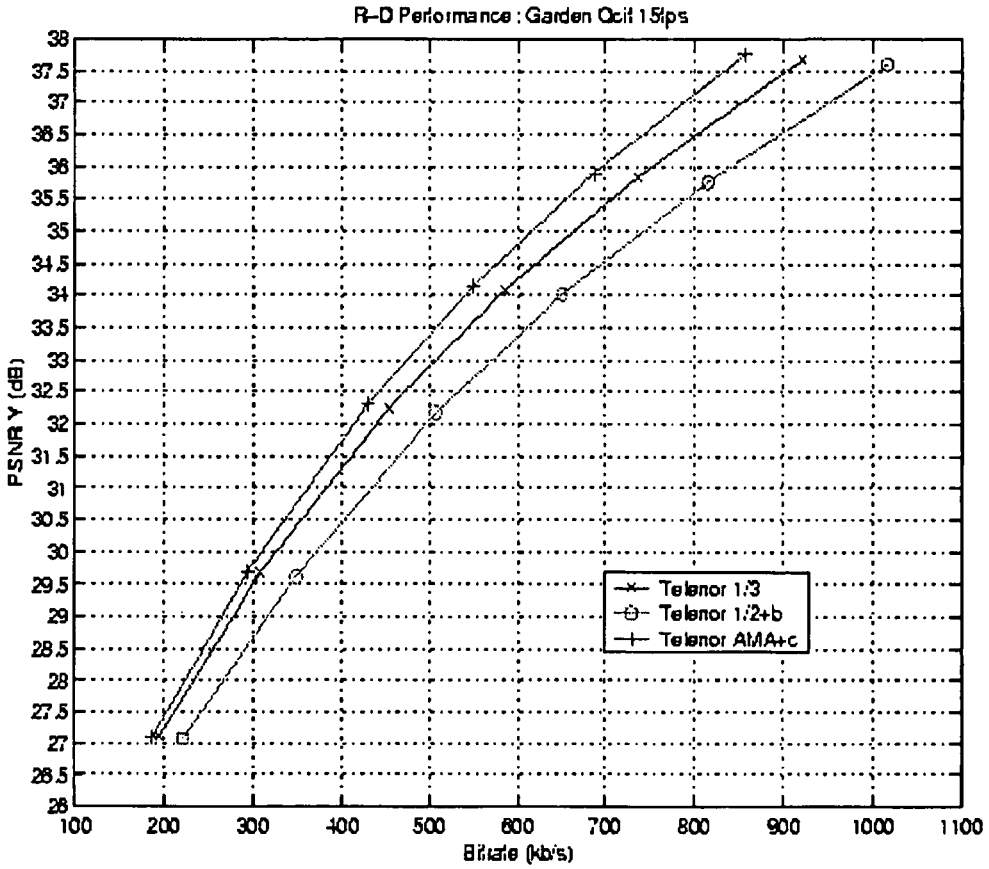
FIG. 12 is a graphical representation of experimental performance results of the Telenor encoder with and without AMA in the "Garden" video sequence, with QCIF resolution, and at the frame rate of 15 frames per second.

| Video sequence | FIG # | Resolution | Frame rate |
|---|---|---|---|
| Container | FIG. 8 | QCIF | 10 |
| News | FIG. 9 | QCIF | 10 |
| Mobile | FIG. 10 | QCIF | 10 |
| | FIG. 11 | SIF | 15 |
| Garden | FIG. 12 | QCIF | 15 |
| Tempete | FIG. 13 | SIF | 15 |
| | FIG. 14 | QCIF | 15 |
| Paris Shaked | FIG. 15 | QCIF | 10 |

The video sequences are commonly used by the video coding community, except for "Paris Shaked." The latter is a synthetic sequence obtained by shifting the well-known sequence "Paris" by a motion vector whose X and Y components take a random value within [−1,1]. This synthetic sequence simulates small movements caused by a hand-held camera in a typical video phone scene.

Comparison Of Full-Search And Fast-Search AMA

The experimental results shown in FIGS. 16 and 17 demonstrate that the encoder performance with fast-search ("Telenor FSAMA+c") and full-search ("Telenor AMA+c") strategies for AMA is practically the same. This is true because the fast-search strategies exploit the convexity of the RD cost curve in the sub-pixel velocity space. In other words, since the shape of the RD cost follows a smooth convex curve, its minimum should be easy to find with some smart fast-search schemes that descend down the curve.

Combining AMA And Multiple Reference Frames

Figure 18:
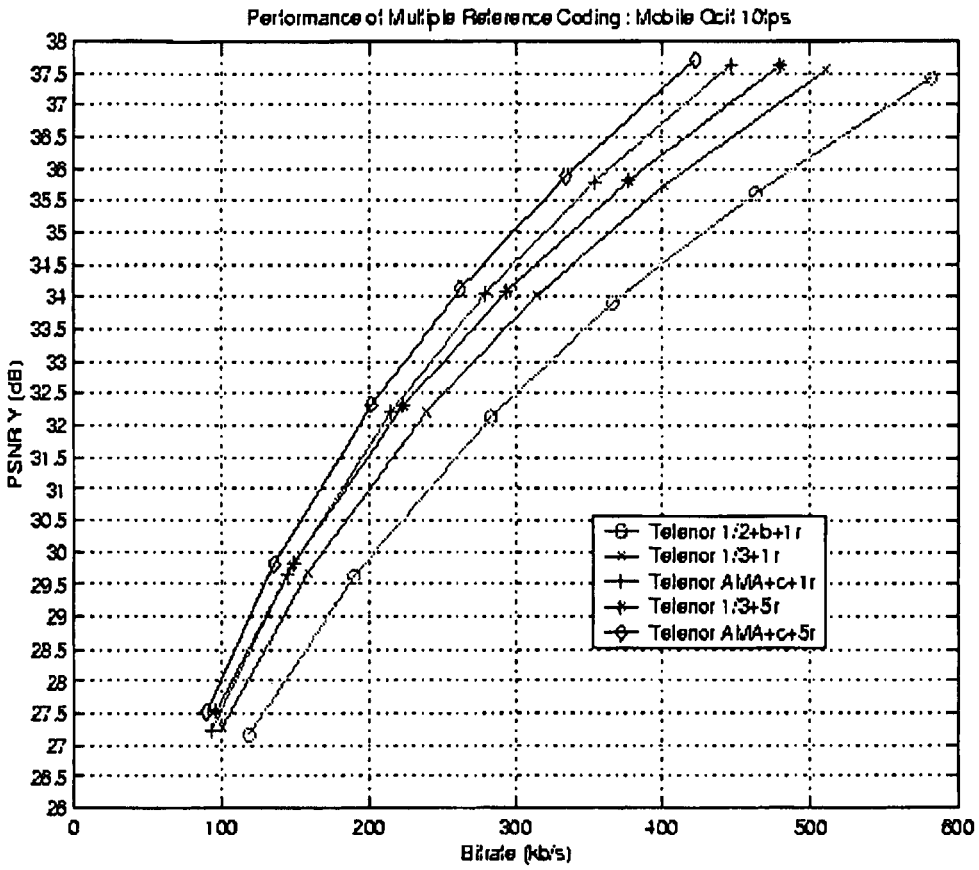
FIG. 18 is a graphical representation of experimental performance results of tests using only one reference frame for motion compensation as compared to tests using multiple reference frames for motion compensation in the "Mobile" video sequence, with QCIF resolution, and at the frame rate of 10 frames per second.

In the plot shown in FIG. 18, the curves labeled "1r" used only one reference frame for the motion compensation, so these curves are the same as those presented in FIG. 10. The curves labeled "5r" used five reference frames.

The experiments show that the gains with AMA add to those obtained using multiple reference frames. The gain from AMA in the one-reference case can be measured by comparing the curve labeled with a "+" (Telenor AMA+c+1r) with the curve labeled with an "x" (Telenor ⅓+1r), and the gain in the five-reference case can be measured between the curve labeled with a "diamond" (Telenor AMA+c+5r) with the curve labeled with a "*" (Telenor ⅓+5r).

It should be noted that the present invention may be implemented at the frame level so that different frames could use different motion accuracies, but within a frame all motion vectors would use the same accuracy. Preferably in this embodiment the motion vector accuracy would then be signaled only once at the frame layer. Experiments have shown that using the best, fixed motion accuracy for the whole frame should also produce compression gains as those presented here for the macroblock-adaptive case.

In another frame-based embodiment the encoder could do motion compensation on the entire frame with the different vector accuracies and then select the best accuracy according to the RD criteria. This approach is not suitable for pipeline, one-pass encoders, but it could be appropriate for software-based or more complex encoders. In still another frame-based embodiment, the encoder could use previous statistics and/or formulas to predict what will be the best accuracy for a given frame (e.g., the formulas set forth in the Ribas work or a variation thereof can be used). This approach would be well-suited for one-pass encoders, although the performance gains would depend on the precision of the formulas used for the prediction.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

[1. A fast-search adaptive motion accuracy search method for estimating motion vectors in motion-compensated video coding by finding a best motion vector for a macroblock, said method comprising the steps of:

(a) searching a first set of motion vector candidates in a grid of sub-pixel resolution of a predetermined square radius centered on $V_1$ to find a best motion vector $V_2$ using a first criteria;

(b) searching a second set of motion vector candidates in a grid of sub-pixel resolution of a predetermined square radius centered on $V_2$ to find a best motion vector $V_3$ using a second criteria;

(c) searching a third set of motion vector candidates in a grid of sub-pixel resolution of a predetermined square radius centered on $V_3$ to find said best motion vector of said macroblock using a third criteria; and (d) wherein at least one of said first criteria, said second criteria, and said third criteria is a rate-distortion criteria.]

[2. The method of claim 1, said step of searching a first set of motion vector candidates in a grid of sub-pixel resolution of a predetermined square radius centered on $V_1$ to find a best motion vector $V_2$ further comprising the step of searching a first set of eight motion vector candidates in a grid of ½-pixel resolution of square radius 1 centered on $V_1$ to find a best motion vector $V_2$.]

[3. The method of claim 1, said step of searching a second set of motion vector candidates in a grid of sub-pixel resolution of a predetermined square radius centered on $V_2$ to find a best motion vector $V_3$ further comprising the step of searching a second set of eight motion vector candidates in a grid of ⅙-pixel resolution of square radius 1 centered on $V_2$ to find a best motion vector $V_3$.]

[4. The method of claim 1 further comprising the steps of using $V_2$ as the motion vector for the macroblock if $V_2$ has the smallest rate-distortion cost and skipping step (c) of claim 1.]

[5. The method of claim 1, said step of searching a third set of motion vector candidates in a grid of sub-pixel resolution of a predetermined square radius centered on $V_3$ to find said best motion vector of said macroblock further comprising the step of searching a third set of eight motion vector candidates in a grid of ⅙-pixel resolution of square radius 1 centered on $V_3$ to find said best motion vector of said macroblock.]

[6. The method of claim 1, said step of searching a third set of motion vector candidates in a grid of sub-pixel resolution of a predetermined square radius centered on $V_3$ to find said best motion vector of said macroblock further comprising the step of skipping motion vector candidates of said third set of motion vector candidates that have already been tested.]

[7. The method of claim 1 further wherein said step of searching said first set of motion vector candidates further comprises the step of searching said first set of motion vector candidates using a first filter to do a first interpolation, said step of searching said second set of motion vector candidates further comprises the step of searching said second set of motion vector candidates using a second filter to do a second interpolation, and said step of searching said third set of motion vector candidates further comprises the step of searching said third set of motion vector candidates using a third filter to do a third interpolation.]

[8. The method of claim 1, said step of searching a second set of motion vector candidates in a grid of sub-pixel resolution of a predetermined square radius centered on $V_2$ to find a best motion vector $V_3$ further comprising the steps of:

(a) searching three candidates of ⅓-pel accuracy $V_2$ and a ½-pel location with the next lowest rate-distortion cost if $V_2$ is at the center;

(b) searching four vector candidates of ⅓-pel accuracy that are closest to $V_2$ if $V_2$ is a corner vector; and (c) determining which of two corners has lower rate-distortion cost and searching four vector candidates of ⅓-pel accuracy that are closest to a line between said corner with lower rate-distortion cost, if $V_2$ is between two corners vectors.]

[9. An adaptive motion accuracy search method for estimating motion vectors in motion-compensated video coding by finding a best motion vector for a macroblock, said method comprising the steps of:

(a) searching a first set of motion vector candidates in a grid centered on $V_1$ using a first criteria to find a best motion vector $V_2$ using a first filter to do a first interpolation;

(b) searching a second set of motion vector candidates in a grid centered on $V_2$ using a second criteria to find a best motion vector $V_3$ using a second filter to do a second interpolation; and (c) searching a third set of motion vector candidates in a grid centered on $V_3$ using a third criteria to find said best motion vector of said macroblock using a third filter to do a third interpolation;

(d) wherein at least one of said first criteria, said second criteria, and said third criteria is a rate-distortion criteria.]

[10. The method of claim 9 wherein said step of searching using a first filter to do a first interpolation further comprises using a simple filter to do a coarse interpolation.]

[11. The method of claim 9 wherein said step of searching using a first filter to do a first interpolation further comprises using a simple filter to do a coarse interpolation and said step of searching using a second filter to do a second interpolation further comprises using a complex filter to do a fine interpolation.]

[12. The method of claim 11 wherein said step of searching using a third filter to do a third interpolation further comprises using a complex filter to do a fine interpolation.]

[13. The method of claim 9 wherein said step of searching using a first filter to do a first interpolation further comprises using a bilinear filter to interpolate the reference frame by 2×2.]

[14. The method of claim 9 wherein said step of searching using a first filter to do a first interpolation further comprises using a bilinear filter to interpolate the reference frame by 2×2 and said step of searching using a second filter to do a second interpolation further comprises using a cubic filter to do a fine interpolation.]

[15. The method of claim 14 wherein said step of searching using a third filter to do a third interpolation further comprises using a cubic filter to do a fine interpolation.]

[16. An adaptive motion accuracy search method for estimating motion vectors in motion-compensated video coding by finding a best motion vector for a macroblock, said method comprising the steps of:

(a) searching at a first motion accuracy for a first best motion vector of said macroblock;

(b) encoding said first best motion vector and said first motion accuracy;

(c) searching for at least one second best motion vector of said macroblock at an at least one second motion accuracy;

(d) encoding said at least one second best motion vector and said at least one second motion accuracy; and (e) selecting the best motion vector of said first and at least one second best motion vectors using rate-distortion criteria.]

[17. The method of claim 16 wherein said step of selecting the best motion vector using rate-distortion criteria further comprises the step of said rate-distortion criteria adapting according to the different motion accuracies to determine both the best motion vectors and the best motion accuracies.]

[18. The method of claim 16, said step of searching for at least one second best motion vector at an at least one second motion accuracy further comprising the step of searching for at least one second best motion vector of said macroblock at an at least one second motion accuracy that is finer than said first motion accuracy.]

[19. The method of claim 16 wherein said step of selecting the best motion vector using rate-distortion criteria further comprises the step of using rate-distortion criteria of the type "distortion+L*Bits" to select the best motion vector.]

[20. An adaptive motion accuracy search method for estimating motion vectors in motion-compensated video coding by finding a best motion vector for a macroblock, said method comprising the steps of:

(a) searching at a motion accuracy for a best motion vector of said macroblock using rate-distortion criteria;

(b) encoding said motion accuracy using a code from a VLC table that is interpreted differently at different coding units according to the associated motion vector accuracy; and (c) encoding said best motion vector in the respective accuracy space.]

[21. A system for estimating motion vectors in motion-compensated video coding by finding a best motion vector for a macroblock, said system comprising:

(a) a first encoder for searching a first set of motion vector candidates in a grid of sub-pixel resolution of a predetermined square radius centered on $V_1$ using a first criteria to find a best motion vector $V_2$;

(b) a second encoder for searching a second set of motion vector candidates in a grid of sub-pixel resolution of a predetermined square radius centered on $V_2$ using a second criteria to find a best motion vector $V_3$; and (c) a third encoder for searching a third set of motion vector candidates in a grid of sub-pixel resolution of a predetermined square radius centered on $V_3$ using a third criteria to find said best motion vector of said macroblock;

(d) wherein at least one of said first criteria, said second criteria, and said third criteria is a rate-distortion criteria.]

[22. The system of claim 21 wherein said first, second, and third encoders are a single encoder.]

[23. A fast-search adaptive motion accuracy search method for estimating motion vectors in motion-compensated video coding by finding a best motion vector for a macroblock, said method comprising the steps of:

(a) searching a first set of motion vector candidates in a grid of sub-pixel resolution of a predetermined square radius centered on $V_1$ to find a best motion vector $V_2$;

(b) searching a second set of motion vector candidates in a grid of sub-pixel resolution of a predetermined square radius centered on $V_2$ to find a best motion vector $V_3$;

(c) searching a third set of motion vector candidates in a grid of sub-pixel resolution of a predetermined square radius centered on $V_3$ to find said best motion vector of said macroblock, and (d) using $V_2$ as the motion vector for the macroblock if $V_2$ has the smallest rate-distortion cost and skipping step (c).]

[24. The method of claim 1, wherein said first criteria, said second criteria, and said third criteria are all rate-distortion criteria.]

[25. The method of claim 9, wherein said first criteria, said second criteria, and said third criteria are all rate-distortion criteria.]

[26. The system of claim 21, wherein said first criteria, said second criteria, and said third criteria are all rate-distortion criteria.]

*27. A method of performing, at a video encoder, motion-compensated video encoding of an input image having respective frames each of which is decomposed into blocks, comprising:*

*searching, block by block, for a motion vector that represents an amount of movement from a corresponding position of a reference frame in an objective current block for each of the blocks decomposed from a frame of the input image,*

*compensating a motion using the motion vector, the motion vector having fractional accuracy expressed by 1/N pel (where N is an integer ≥2),*

*encoding the accuracy of the motion vector and the motion vector, wherein encoding the accuracy is performed separately from encoding the motion vector,*

*said encoding the motion vector step encoding the motion vector for each block on a block-by-block basis,*

*said searching and said compensating steps are performed by selecting a filter from a plurality of interpolation filters according to the accuracy, wherein the accuracy is set on a frame basis such that the same accuracy is used for every motion vector in a frame but a different accuracy can be used for a different frame.*

*28. A method of decoding, at a video decoder, motion-compensated coded data obtained by encoding an image frame block-by-block, comprising:*

*decoding a motion vector that represents an amount of movement from a corresponding position of a reference frame in an objective current block for each of the blocks included in the coded data obtained,*

*decoding an accuracy of the motion vector, the motion vector having fractional accuracy expressed by 1/N pel (where N is an integer ≥2),*

*compensating a motion using the accuracy and the motion vector,*

*said decoding the accuracy step being performed separately from said decoding the motion vector step,*

*said decoding the motion vector step being performed on a block-by-block basis,*

*said motion compensation step being performed by selecting a filter from a plurality of interpolation filters according to the accuracy,*

*wherein the accuracy is set on a frame basis such that the same accuracy is used for every motion vector in a frame but a different accuracy can be used for a different frame.*

* * * * *